Oct. 10, 1961  W. B. GILES ET AL  3,003,474
HYDRAULIC CONTROL SYSTEM WITH FLOW RESTRICTING MEANS
Filed July 31, 1956

Inventors:
Walter B. Giles,
Robert A. Aiken, by Roe D McBurnett
Their Attorney.

United States Patent Office 3,003,474
Patented Oct. 10, 1961

3,003,474
HYDRAULIC CONTROL SYSTEM WITH FLOW RESTRICTING MEANS
Walter B. Giles, Schenectady, and Robert A. Aiken, Scotia, N.Y., assignors to General Electric Company, a corporation of New York
Filed July 31, 1956, Ser. No. 601,322
7 Claims. (Cl. 121—41)

The present invention relates to a hydraulic control system and more particularly to a hydraulic control system for selectively controlling the rate of flow of fluid from a source of fluid pressure to a fluid actuated device, such as a servomotor, through a flow impedance in the system.

Generally, hydraulic control systems are provided with amplifying means whereby a main power stage valve, hereinafter called a second stage, is actuated or moved by the operation of a control stage valve, hereinafter called a first stage. The amplification is normally provided by the utilization of a two-stage hydraulic valve system wherein the second stage is operated by fluid pressure which is controlled by the first stage so that the force required to operate the first stage valve is only a fraction of that required to move the main valve.

In hydraulic valves having a flow controlling member, such as a valve stem, any variation of its position relative to the supply and drain conduits, defines an orifice of varying size. Consequently, when the valve first opens, a high velocity flow passes by the flow control meber and generates, in accordance with Bernoulli's law, high local velocities which produce local drops in pressure. This condition results in a non-uniform local static pressure distribution relative to the flow control member which has a tendency to return the meber to the neutral position.

Accordingly, the reaction force generated by this non-uniform pressure distribution and commonly called valve reaction, tends to move the flow control member back to the neutral position once it has been displaced in either direction from neutral and must be counterbalanced so that the unbalanced hydraulic force on the movable flow control member or valve stem is minimized. For example, when the available input signal force to the first stage valve is small, the effect of the valve reaction will cause the operation of the output member, such as a servomotor, to become erratic or deviate from the predetermined schedule of servomotor output movement versus first stage input. Also, if one stage were used alone, for high output flows, the valve reaction would produce centering forces on the valve stem and the input force to the one stage would generally not be sufficient to overcome these forces.

Presently, various attempts are made to minimize valve reaction, for example, by contouring the valve or by compensating means such as inserting compensating dams in the valve structure. In contouring the valve, the valve stem and coacting block are structurally altered so that as the fluid enters the valve at high velocity the contour of the structure will offset the flow and creat vortices at least over part of the flow before its exit from the valve so that the flow undergoes a change of momentum which offsets any change or unbalancing of the hydraulic force.

In order to minimize or reduce the valve reaction by the use of compensating dams inserted within the valves, a flow restricting device is provided in the flow path of the fluid so that the resulting difference in hydraulic pressures on the upstream and downstream sides of the flow restricting device provides a valve biasing force in a direction to compensate for the valve reaction. However, these approaches, although providing a compact valve, have the disadvantage of high cost, complicated structural arrangements with accompanying serious maintenance problems, and complex manufacturing procedures to maintain extremely high tolerances.

Other methods presently utilized to overcome valve reaction are the provision of a first stage valve relaying a substantial force gain to the second power stage. In this manner, the valve reaction is overcome by brute force; however, in this method it is essential to provide position feedback from the second stage to the first stage. This feedback, usually accomplished electrically or mechanically, complicates the hydraulic control system since the structure includes two feedbacks, one from the second stage to the first stage and the other from the output or servomotor to the first stage.

Position feedback from the second stage to the first stage stage is often accomplished by hydraulic means whereby feedback is provided by means of capillaries between the ends of the second stage and coacting drain conduits and structurally provided between the end lands of the valve stem and the valve sleeve. This type of feedback is limited by large power loss due to standby leakage and the limited frequency response of the second stage to the input of the first stage. Further, for a given input of the first stage, fluid flow is supplied to the ends of the second stage and the position of the valve stem adjusted until it reaches a new pressure balance. In this method, leakage through the capillaries is dependent on the capillary length, or position of the second stage wherein the capillaries are integrally formed. The response of this arrangement is directly dependent on the standby, or control, leakage. For example, a high response would require a high leakage flow which would result in appreciable standby power requirement.

Also, capillaries are very temperature sensitive and have a limit in response which is detrimental. For example, when the capillary is opened up in clearance to provide a higher ersponse it begins to act less like a capillary and more like an orifice which is not position sensitive, referring to the position or displacement of the valve stem in the second stage. Tests on this type of hydraulic control system usually indicate a response limitation of approximately a hundred radians per second.

The present invention provides a two-stage valve whereby positioning of the first stage valve allows fluid flow to pass through a flow impedance or restrictive device across the ends of the second stage, so that a pressure drop is developed which reacts against the ends of the second stage to position it in proportion to the input to the first stage. In turn, the second stage controls the flow delivered to a load, such as the servomotor. Thus, the second stage is controlled by a potential, or a pressure drop, rather than flow, so that there is no standby power requirement. Standby power is dependent on any leakage in the system which will be a function of the manufacturing tolerances and can be controlled to reduce the leakage to an insignificant amount.

Further, temperature variations in the present system may be minimized by the utilization of a variable orifice as a flow restricting means. Consequently, a hydraulic control system is provided with a two-stage valve that does not have any design standby leakage in valve stem position control, but does have a high response and is not sensitive to temperature. In brief, the present invention utilizes a pressure output valve as the first stage, whereby the first stage valve actually puts out flow which is converted by the presence of a restriction between the ends of the second stage to a pressure signal on the second stage to displace the valve stem of the second stage in accordance with the pressure signal.

An object of the present invention is the provision of a hydraulic control system wherein the displacement of a second stage valve is proportional to the direction and magnitude of a pressure drop controlled by the first stage valve.

Another object is to provide a hydraulic control system with a two-stage valve wherein the second stage valve does not experience any standby leakage, has a high response to input, and is not sensitive to temperature.

A further object of the invention is the provision of a hydraulic control system having a first stage with flow output to a flow restriction converting the flow output into a pressure signal proportional in direction and magnitude to the displacing force on the first stage valve.

Other objects and many of the attendant advantages of this invention will be readily appreciated as the same become better understood by reference to the following detailed description when considered in connection with the accompanying drawings in which like reference numerals designate like parts throughout the figures thereof and wherein.

Figure 1:
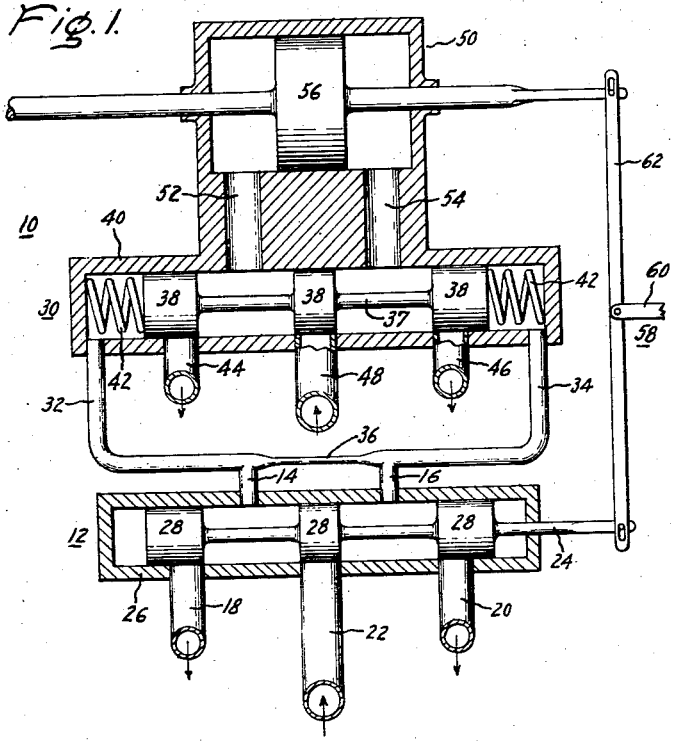
FIGURE 1 is a side view, partly in section, of a preferred embodiment of the invention with the output conduits connected to a hydraulic servomotor.

Referring now to the drawings, there is shown a preferred embodiment 10 of the two-stage potential valve as applied to a load positioning system. The first stage 12 is provided with outlet conduits 14 and 16, drain outlets 18 and 20, and a fluid pressure supply line 22. A valve stem 24 is provided in the first stage 12 slidably coacting with a valve sleeve 26.

The valve stem 24 is provided with a plurality of lands 28 cooperating with the drain outlets 18 and 20 and the pressure supply line 22 to control the flow through the first stage. A second stage 30 is provided with inlet conduits 32 and 34 coupled to outlet conduits 14 and 16, respectively. The conduits 32 and 34 are connected by a capillary 36 forming a flow restriction therebetween, as hereinafter described.

The second stage 30 is provided with a valve stem 37 having a plurality of lands 38 coacting with a sleeve portion 40. The second stage valve stem 37 is biased by a number of resilient means, such as springs 42, or the like, at each end thereof which cooperate therewith to maintain said valve stem in a balanced position relative to a number of outlet conduits 44 and 46, and with a fluid pressure supply line 48. The fluid pressure supply line 22 and 48 are connected to a conventional fluid pressure source, not shown.

Insofar as the springs 42 are concerned, their utilization for centering the second stage valve need not exist physically since the valve reaction of the second stage can provide this function. However, in such a case the system will be load dependent and, therefore, a function of the particular load characteristics in the system.

A servomotor 50 operatively cooperates with the second stage valve 30 through output conduits 52 and 54. The servomotor is provided with a piston member 56 which is longitudinally displaced relative to said motor 50 in proportion to the direction and magnitude of the displacing fluid force selectively entering the motor through output conduits 52 and 54.

The piston 56 is coupled to a load, not shown, to actuate it in response to a predetermined input to the first stage valve which, in turn, is a function of the electrical or mechanical actuation of a feedback linkage 58 pivotally coupled to the piston 56 and to the valve stem 24. The feedback linkage 58 consists of an input linkage 60, actuated in response to a predetermined schedule, having one end pivotally mounted on a connecting link 62 which is pivotally and slidably connected to the servomotor piston 56 and to the valve stem 24.

In the operation of the preferred embodiment 10, an input displacement of the input linkage 60 to the left causes only a displacement of the first stage valve stem 24 with respect to the valve sleeve 26. Since the inertia of the piston 56 in the servomotor 50 will prevent any displacement thereof, a displacement of the input linkage 60 will initially displace only the valve stem 24. This displacement of the valve stem 24 to the left allows fluid to flow from the fluid pressure supply line 22 to and through the outlet conduit 16, so that fluid will flow through the flow restriction 36 from right to left, and develop a pressure drop therethrough which is transmitted by the conduits 32 and 34 to both ends of the valve stem 37 in the second stage 30.

This pressure signal acting against the bias of the second stage springs 42 causes a predetermined displacement of the second stage valve stem 37 to provide, in turn, a velocity output to the servomotor 50. The velocity output to the servomotor 50 is sensed through the feedback linkage 58, movement of the connecting link 62 pivoting about the end of the input linkage 60, to the first stage valve stem 24 so as to displace the stem until it is nulled. In this manner, a two-stage potential valve is provided whereby actuation of a first stage valve 12 establishes a position of a second stage valve 30 through a predetermined pressure drop developed in the fluid coupling therebetween, in turn, to provide a given flow output from the second stage valve 30.

The preferred embodiment 10 sets forth a two stage valve that does not have any standby leakage relative to the positioning of the valve stem 37, since any leakage would be a function of the manufacturing tolerances between the lands 38 and the cooperating sleeve 40. The two-stage potential valve utilizes a pressure output valve as the first stage 12 which actually puts out flow; however, the flow restriction 36, in this case a capillary, changes flow to a pressure signal on the second stage valve 30. Further, actual tests indicate a response up to approximately 250 cycles per second (1500 radians per second) to thereby give an approximate response ratio improvement of 15 to 1 in comparison to a response limitation of approximately 100 radians per second presently obtainable in known comparable hydraulic control systems.

The flow restriction in the preferred embodiment 10 can be an orifice, a capillary, or any combination thereof. However, if the restriction is a capillary, as shown in FIG. 1, it is temperature sensitive due to the well-known viscosity versus temperature effects. If the flow restriction between the inlet conduits 32 and 34 is an orifice, the hydraulic control system tends to experience deadbands in the initial region of flow because of inherent orifice characteristics. A graphical illustration of the pressure drop versus flow for a typical orifice is shown in dotted line in FIG. 3, wherein the deadband region will be as approximately indicated by "X." The plot of flow versus pressure drop is obtained by use of the following orifice equations:

$$Q = C_d \cdot A \cdot \sqrt{\frac{2\Delta P}{\rho}}$$

$$\Delta P = \rho/2 \cdot \left(\frac{Q}{C_d \cdot A}\right)^2$$

wherein $C_d$ is the coefficient of discharge;
$A$ is the cross-sectional area of the orifice; and
$\rho$ is the mass density of the fluid.

Figure 2:
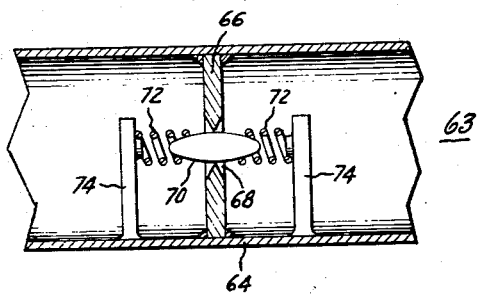
FIGURE 2 illustrates a modification of the restricting means of the preferred embodiment.

Accordingly, to avoid these temperature and deadband difficulties the flow restriction, if an orifice, should be a variable orifice. A modification 63 of the flow restrictive capillary, shown in the preferred embodiment 10, is illustrated in FIG. 2 wherein 64 illustrates a conduit connecting the inlet conduits 32 and 34 as does the capillary 36 of the preferred embodiment. The connecting conduit 64 is of a constant cross-sectional area and is provided with a center disc 66 having a knife-edged aperture 68 in the center thereof.

A solid valve member 70, substantially shaped as a prolate spheroid, is mounted within said aperture so that the valve member's maximum diameter is slightly smaller than the diameter of the aperture 68 so as to slidably coact therewith. The valve member 70 is supported by a number of axially aligned resilient means, such as springs 72, or the like, mounted on brackets 74 fixedly supported within the conduit 64 so as to not interfere with the fluid flow therethrough. In this manner, the member 70 is free to float within said aperture so as to be longitudinally displaceable relative to said aperture due to the force produced by the action of the fluid under pressure acting against the surface of the valve member 70. Therefore, the movement of the valve member 70 is a function of the fluid pressure flowing through the conduit 64 in response to the displacement of the valve stem 24.

Figure 3:
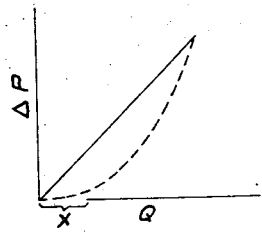
FIGURE 3 is a graph of the pressure drop versus the flow for a uniform cross-sectional area flow restricting orifice shown in dotted lines and for a flow restricting variable orifice in solid lines.

The variable orifice illustrated in FIG. 2, can be designed to give any desired relationship between the flow and the pressure drop, as shown in solid line in FIG. 3, and to thereby minimize any deadband in the system. By utilizing a variable orifice the temperature effect is minimized since the temperature effect is dependent on density changes instead of the viscosity changes as in a capillary. The operation of the preferred embodiment 10 with a modification of the flow restriction as shown in FIG. 2, will be the same as with the capillary 36.

A steady state analysis of a two-stage potential valve, as shown in the preferred embodiment 10, is herein included to further set forth the relationship of the first stage 12 and second stage 30 and the flow restriction, such as the capillary 36 and the orifice 63, therebetween. The first stage 12 is considered as ideal with the lands 28 lapped line-to-line with their respective ports, as shown in FIG. 1. For simplicity, all the port openings in the first and second stage valves will be taken as rectangular with width "b." Therefore, for an input displacement, "X," of the valve stem 24 toward the left of FIG. 1, the flows through the embodiment 10 are as follows:

$$q = C_d \cdot b \cdot X \cdot \sqrt{2/\rho (P_s - P_1)} = C_d \cdot b \cdot X \cdot \sqrt{2/\rho \cdot P_2} \quad (1)$$

also $$q = L(P_1 - P_2) \quad (2)$$

if a desired linear relationship between pressure drop and flow, as indicated by the solid line plot of FIG. 3, is assumed.

Where, $C_d$ = orifice coefficient (of the flow restriction with either the capillary 36, the variable orifice 63, or any combination thereof).
$\rho$ = mass density of liquid.
$P_s$ = supply pressure through the supply line 22.
$L$ = conductance of fluid resistance path connecting the inlet conduits 32 and 34, shown as a capillary 36 in the preferred embodiment of FIG. 1 and as a variable orifice 63 in the modification of FIG. 2.
$A$ = the cross-sectional area of the end lands 38 in the second stage 30.
$K$ = the spring constant of the springs 42.
$P_1$ = the pressure in the inlet conduit 34.
$P_2$ = the pressure in the inlet conduit 32.

From (1) we have $$P_s = P_1 + P_2 \quad (3)$$

Therefore, $$P_1 - P_2 = P_s - 2P_2 \quad (4)$$

Substituting into (2) and equating (1) and (2)

$$C_d \cdot b \cdot X \cdot \sqrt{2/\rho \cdot P_2} = L(P_s - 2P_2) \quad (5)$$

Now, let $$q_0 = C_d \cdot b \cdot X \cdot \sqrt{P_s/\rho}$$

where $q_0$ is the flow through an unloaded first stage valve.
Therefore, $$q_0 \cdot \sqrt{2} \cdot \sqrt{P_2/P_s} = L(P_s - 2P_2) \equiv L \cdot P_s (1 - 2 P_2/P_s)$$

and $$2 \cdot q_0^2 \cdot P_2/P_s = L^2 \cdot P_s^2 [1 - 4(P_2/P_s) + 4(P_2^2/P_s^2)]$$

Let $$q_r = L \cdot P_s$$

and $$\delta = q_0/q_r = q_0/L \cdot P_s$$

Where $q_r$ is the flow through the flow restriction, either the capillary 36 or the orifice 63, with full fluid pressure supply across it.
Therefore, $$2 \cdot \delta^2 \cdot P_2/P_s = 1 - 4(P_2/P_s) + 4(P_2^2/P_s^2)$$

or $$P_2^2/P_s^2 - \left(1 + \frac{\delta^2}{2}\right) \cdot P_2/P_s + 1/4 = 0 \quad (6)$$

and $$P_2/P_s = \frac{1 + \frac{\delta^2}{2} \pm \sqrt{1 + \delta^2 + (\delta^4/4)} - 1}{2} \quad (7)$$

From Equation 4

$$\frac{P_1 - P_2}{P_s} = 1 - 2(P_2/P_s) = -\delta^2/2 \pm \sqrt{\delta^2 + \delta^4/4}$$

Now, using the "+" sign since $P_1$ is greater than $P_2$, and since $\delta$ is far less than 1, we may neglect the $\delta^4/4$ under the radical.
Therefore, $$\frac{P_1 - P_2}{P_s} \approx \delta - \delta^2/2$$

For a further approximation, we may also neglect $\delta^2/2$. Then, $$\frac{P_1 - P_2}{P_s} \approx \delta$$

Now, the output position "Y" of the second stage is given by $$A(P_1 - P_2) = K \cdot Y$$

Therefore, $$A \cdot \delta \cdot P_s \approx K \cdot Y$$

or $$Y \approx \frac{A \cdot \delta \cdot P_s}{K} \quad (8)$$

Accordingly, it can be seen from Equation 8 that the longitudinal displacement of the output piston 56, "Y," is proportional to the longitudinal displacement of the input valve stem 24, "X." Therefore, a hydraulic control system is provided for selectively controlling the rate of fluid from a source of fluid pressure to a servo-motor 50.

In brief, there is shown a preferred embodiment 10, of the present invention, comprising a two-stage potential valve wherein a positioning of the first stage 12 by the actuation of the input linkage 60 will allow a flow to pass through the flow restriction, the capillary 36 or the variable orifice 63, across the ends of the second stage valve 30. The flow restriction will convert this flow into a pressure drop which will cause the valve stem 36 to be displaced a predetermined amount relative to the springs 42. The second stage, in turn, will determine the flow delivered to the servomotor 50 from the fluid pressure supply line 48.

As can be seen, the second stage valve 30 is controlled by a potential, or a pressure drop, rather than flow. Accordingly, there is no standby power requirement since there is no standby leakage in the system. For example, tests indicate that the power loss of the preferred embodiment 10 relative to presently utilized hydraulic control systems is in a ratio of approximately one to ten, respectively. Theoretically there does not have to be any standby leakage in the system, since such leakage is dependent only on manufacturing tolerances maintained between the valve stem lands and the operatively coacting valve sleeve members of the system.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. Hydraulic control system comprising a source of fluid pressure, a pair of fluid conduits, a first stage valve connected between said conduits and said source for varying the rate of fluid flow from said source to one of said conduits, a flow restricting means fixedly mounted between said pair of fluid conduits so as to provide a coupling therebetween, a second stage valve for selectively connecting either of a pair of output conduits to said source, a valve sleeve, said second stage valve having a longitudinally movable valve stem slidably mounted in said sleeve so as to form a chamber at each end of said sleeve, centering means in said sleeve for biasing each end of said valve stem, each of said pair of fluid conduits coupled to one of said chambers so that said valve stem will be longitudinally displaced in response to pressure drop through said flow restricting means.

2. Hydraulic control system comprising a pair of fluid conduits selectively connected to a fluid pressure source and having flow restricting means connecting said pair of fluid conduits, a first stage valve connected between said conduits and said source for controlling the fluid flow from said source to one of said conduits so as to selectively vary pressure drop through the connecting flow restricting means, a second stage valve adapted to selectively connect either of two output conduits to said fluid pressure source, biasing means for maintaining said second stage valve in a predetermined initial position, said second stage valve being operatively coupled to said pair of fluid conduits on the downstream side of said flow restricting means whereby said second stage valve will move in accordance with the direction and magnitude of the pressure drop developed across said flow restricting means, said second stage valve being so constructed as to substantially eliminate fluid leakage from said fluid conduits past said second stage valve.

3. Hydraulic control system comprising a pair of fluid conduits connected to a fluid pressure source and having flow restriction means fixedly mounted therebetween, a first stage valve having a control member connected between said conduits and said source in a position displaced from said flow restricting means for progressively varying the proportion of fluid flow from said fluid source through said flow restricting means, a second stage valve having control means for selectively connecting either of two output conduits to said fluid pressure source, means for biasing said second stage valve flow control means to a predetermined initial position, said fluid conduits connected to the ends of said second stage valve so that said control means will be actuated in a direction corresponding to the sense of the pressure drop of the fluid flow through said restricting means and said second stage valve control means may be controllably positioned in accordance with the displacement of said first stage valve control member from a null position.

4. A two-stage hydraulic valve for controlling a hydraulic pressure fluid utilization device comprising a fluid pressure supply line, a pair of inlet conduits, a first stage valve coupling said supply line and said inlet conduits, capillary means connecting said pair of inlet conduits, a second stage valve having each end thereof connected to said inlet conduits and responsive to a pressure drop developed through said connecting capillary means to thereby position said second stage in proportion to the input to said first stage, said second stage valve being so constructed as to substantially eliminate any standby leakage in said first and second stage valves.

5. A hydraulic control system having a fluid source, a pair of inlet conduits, a first stage valve controlling the rate of flow from said source to said inlet conduits, a variable orifice connecting said pair of inlet conduits so as to develop a pressure drop therebetween, a second stage valve operatively connected to said inlet conduits and adapted to be displaced in proportion to the direction and magnitude of the existing pressure drop, said second stage valve being so constructed as to substantially eliminate fluid leakage from said inlet conduits past said second stage valve.

6. A hydraulic system for controlling the rate of fluid flow to a servomotor comprising a source of fluid pressure, flow impedance means, a first stage valve connecting said source and said impedance means so as to vary the rate of fluid flow therebetween, a spring centered second stage having an output, and a plurality of conduits transmitting pressure drop developed by fluid flow through said impedance means to position said second stage, thereby controlling the rate of fluid flow from said second stage, the relation between said second stage and said flow impedance means being such that fluid leakage between said first stage and said second stage is substantially eliminated.

7. Hydraulic system, for controlling a servo actuator, comprising: a first stage valve including a pair of outlet ports; first pressurized-fluid supply means for operating the first stage valve; a second stage valve including a pair of inlet ports and a pair of outlet ports; second pressurized-fluid supply means for operating the second stage valve; a pair of conduits, each conduit defining a hydraulic path between one of the first stage valve's outlet ports and one of the second stage valve's inlet ports; flow restriction means defining a path between said pair of conduits in order to provide a pressure difference between the second stage valve's inlet ports; a servo actuator hydraulically coupled to the second stage valve's outlet ports; and, feedback linkage means coupling the servo actuator with the first stage valve; said second stage valve being so constructed as to substantially eliminate fluid leakage from said pair of conduits past the second stage valve.

References Cited in the file of this patent

UNITED STATES PATENTS

| | | |
|---|---|---|
| 2,250,344 | Alkan | July 22, 1941 |
| 2,283,541 | Dodson | May 19, 1942 |
| 2,283,753 | Harcum | May 19, 1942 |
| 2,424,288 | Severy | July 22, 1947 |
| 2,582,088 | Walthers | Jan. 8, 1952 |
| 2,709,421 | Avery | May 31, 1955 |
| 2,738,772 | Richter | Mar. 20, 1956 |
| 2,767,689 | Moog | Oct. 23, 1956 |
| 2,797,666 | Chubbuck | July 2, 1957 |
| 2,823,689 | Healy | Feb. 18, 1958 |
| 2,836,154 | Lantz | May 27, 1958 |